United States Patent
Chef et al.

(10) Patent No.: US 9,232,073 B2
(45) Date of Patent: Jan. 5, 2016

(54) METHOD FOR INITIATING A NON-STANDARD MODE FOR AN XDSL TRANSMISSION SYSTEM AND RESIDENTIAL GATEWAY USING THE METHOD

(75) Inventors: Olivier Chef, Evere (BE); Massimo Cuzzola, Wilrijk (BE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/344,320

(22) PCT Filed: Aug. 24, 2012

(86) PCT No.: PCT/EP2012/066470
§ 371 (c)(1),
(2), (4) Date: Feb. 2, 2015

(87) PCT Pub. No.: WO2013/037620
PCT Pub. Date: Mar. 21, 2013

(65) Prior Publication Data
US 2015/0139287 A1    May 21, 2015

(30) Foreign Application Priority Data
Sep. 13, 2011    (EP) ..................................... 11447021

(51) Int. Cl.
*H04B 1/38*    (2015.01)
*H04L 5/16*    (2006.01)
*H04M 11/06*    (2006.01)
*H04L 5/14*    (2006.01)

(52) U.S. Cl.
CPC ............. *H04M 11/06* (2013.01); *H04L 5/1438* (2013.01); *H04M 11/062* (2013.01)

(58) Field of Classification Search
CPC ... H04M 11/06; H04M 11/062; H04L 5/1438
See application file for complete search history.

(56) References Cited

U.S. PATENT DOCUMENTS

| 2002/0114347 | A1 | 8/2002 | Park |
| 2003/0063600 | A1* | 4/2003 | Noma et al. ................... 370/352 |
| 2009/0210554 | A1 | 8/2009 | Schmitt et al. |

FOREIGN PATENT DOCUMENTS

| CN | 1378349 | 11/2002 |
| EP | 1237341 A1 | 9/2002 |
| EP | 1619830 | 1/2006 |
| EP | 2282439 A1 | 2/2011 |
| JP | 2007019873 | 1/2007 |
| JP | 2008072360 | 3/2008 |
| WO | WO-9967891 | 12/1999 |
| WO | WO-2010022174 | 2/2010 |
| WO | WO2011012946 | 2/2011 |

* cited by examiner

*Primary Examiner* — Erin File
(74) *Attorney, Agent, or Firm* — Jack Schwartz & Associates, PLLC

(57) ABSTRACT

The invention defines a method for providing an xDSL broadband transmission service between a central office and a customer premises equipment which comprises the steps: initiating a handshaking procedure between the central office and the customer premises equipment, determining an xDSL transmission standard for providing the xDSL broadband transmission service, utilizing a non standard information field during the handshaking procedure to indicate a support of a non-standard mode between the central office and the customer premises equipment, and initiating the non-standard mode, in case no synchronization is established between the central office and the customer premises equipment after the handshaking procedure.

15 Claims, 2 Drawing Sheets

METHOD FOR INITIATING A NON-STANDARD MODE FOR AN XDSL TRANSMISSION SYSTEM AND RESIDENTIAL GATEWAY USING THE METHOD

This application claims the benefit, under 35 U.S.C. §365 of International Application PCT/EP2012/066470, filed Aug. 24, 2012, which was published in accordance with PCT Article 21(2) on Mar. 21, 2013 in English and which claims the benefit of European patent application No. 11447021.4, filed Sep. 13, 2011.

TECHNICAL FIELD

The invention relates to the field of broadband services over digital subscriber line (DSL), in particular to a method for improving a digital subscriber loop communication to a customer, and to a residential gateway using the method.

BACKGROUND OF THE INVENTION

Digital subscriber line (DSL) technology is a well known data communication technology that enables a high data transmission over twisted pair copper telephone lines and is widely used because present telephone equipment and infrastructure known as POTS can still be operated together with the new DSL services. DSL service and POTS service can operate at the same time because the DSL service uses a frequency range above the frequency range of the POTS service. During the years, several DSL standards, respectively recommendations, have been established differing in upstream and downstream transmission rates and in range, for example asymmetric digital subscriber line recommendations ADSL, ADSL2, ADSL2+, and very high digital subscriber line recommendations VDSL, VDSL2, to meet the increasing demands of internet users. ADSL uses for example a maximum downstream transmission rate of up to 12 Mbit/s and ADSL2+ a downstream maximum transmission rate of up to 24 Mbit/s. These DSL recommendations are referred to in this application as xDSL standards for the sake of simplicity.

xDSL standards are defined by the International Telecommunication Union, ITU, which is an agency of the United Nations responsible for information and communication technologies. The ADSL standards are described e.g. by ITU G.992.5 Annex A for ADSL over POTS, in ITU G.992.1 Annex B for ADSL over ISDN, and ITU G.992.2 for a low transmission rate version ADSL light. Also for ADSL2 and ADSL2+, several standards have been established, e.g. ITU 992.3 Annex J, ITU G992.3 Annex L and ITU G.992.5 Annex M.

FIG. 1 illustrates in a schematic diagram a communications system providing both xDSL broadband data service and narrowband POTS telephone service. At the site of a central office 1, a DSL access multiplexer (DSLAM) 2 is arranged for providing broadband data via a twisted pair copper line 3, also known as a local loop, to the customer premises equipment 4 of a user. The customer premises equipment 4 comprises a splitter (SPL) 5 for separating the xDSL service for a residential gateway 6 and the telephone service for a telephone set 7. The central office 1 may comprise correspondingly a splitter 8 for separating the xDSL service and the telephone service.

Before performing an xDSL service, the residential gateway 6 initiates a handshaking procedure with the central office 1 to establish a data transmission according to a given xDSL standard. This handshaking procedure is defined by ITU standard G.994.1, also known as G.hs, and provides a consistent way of initiating the various types of xDSL residential gateways available now and in the future. During the handshaking procedure, capability lists are exchanged between the central office 1 and the residential gateway 6, and then an xDSL transmission mode is selected in accordance with the capabilities of the residential gateway 6 and the central office 1, and what the user wants or is willing to pay for.

During the handshaking procedure, a defined set of frequency carriers is used, and specified messages are exchanged in a transaction between the central office and the customer premises equipment for providing service information. Possible messages are for example a message CLR, capabilities list ATU-R, which may be send by the residential gateway 6, a message CL, capabilities list, which may be send by the central office 1, a message MR, mode request, which may be sent to request the transmission of an MS message, and a message MS, mode select, which may be sent to request the initiation of a particular mode of operation. The information included in these messages is in particular vendor identification, service and channel parameters and available modulations and protocols. After a transaction, a common mode of operation is selected and in a cleardown procedure the G.994.1 handshaking procedure is terminated.

Each message contains up to three message information fields, which are encapsulated in a frame. A message information field consists of three components: An identification field, followed by a standard information field, and an optional non-standard information field. The identification field and the standard information field include parameters relating to particular transmission modes, features or capabilities associated with the central office and the customer premises equipment. The identification field includes also a parameter field containing parameters independent of the mode to be selected and which includes an information whether a non-standard information field is included or not. The non-standard information field includes information beyond that defined in the G.994.1 handshaking procedure. When a non-standard information field is to be sent, the non-standard field parameter is set to binary one in the identification field of the transmitted message.

During the handshaking procedure, it is the central office who is proposing a profile to the customer premises equipment and the customer premises equipment must follow. The profile consists in a set of parameters such as minimum bitrates, maximum bitrates, modes that are supported, type of connection, impulse-noise protection INP, delay setting and so on. This information is mostly contained in the CL and CLR messages. After having received these messages, an algorithm calculates what would be the best framing parameter choice in order to match the central office profile, and the handshaking procedure continues until synchronization is reached.

After the selection of an xDSL transmission standard, a training procedure follows, during which each of the frequency channels of the selected xDSL standard are tested with regard to transmission parameters, for example signal/noise ratio S/N, interference, damping and other cable characteristics of the local loop, and for each frequency channel an optimized bit rate is determined according to its transmission characteristics. Then, frequency channels having a sufficient signal/noise ratio are selected, and an appropriate modulation is chosen for the selected frequency channels. During the training procedure, the residential gateway is synchronized with the central office, and the residential gateway remains synchronized until the end of a session.

There can be cases in which, due to external factors such as noise, bad wiring or long distances, the constraints of the profile provisioned by the central office will conflict with the line condition and this will result in that the algorithm is not able to find a solution. In other words, the modem will not reach synchronization after the handshaking procedure. These are exceptional cases but in the unlikely situation that these conditions occur, there is no escape mechanism in the standard to deal with the situation with the result that the residential gateway tries endlessly to achieve service with no success. In such a case, the central office cannot offer an xDSL broadband transmission service for the customer, and since no communication to the customer premises equipment is possible, the central office can also not understand the reason why the handshaking procedure has failed.

WO 2010/022174 discloses a DSL communication system and a method for configuring a DSL communication system to provide a robust digital subscriber loop communication. The method includes training at least one anchor DSL modem transmitter to transmit information over at least one anchor line at an anchor bit rate that is determined based on an allowable tolerable noise level and a minimum allowable signal-to-noise ratio (SNR) margin; training one or more other DSL modem transmitter to transmit information over one ore more other line at a bit rate that is determined by a current noise level and a target SNR margin, wherein the target SNR margin is higher than the minimum allowable SNR margin.

US2003063600 discloses an ADSL modem that can effectively perform a re-initialization process without terminating a data communication. The ADSL modem monitors the communication status during a data communication, determines whether the current communication status needs a re-initialization and requests a re-initialization of an opposing ADSL modem apparatus by transmitting ClearEOC when a re-initialization is necessary. It is therefore possible to perform a re-initialization process during the data communication.

SUMMARY OF THE INVENTION

The invention defines a method for providing an xDSL broadband transmission service between a central office and a customer premises equipment which comprises the steps: initiating a handshaking procedure between the central office and the customer premises equipment, determining an xDSL transmission standard with a specified transmission rate during the handshaking procedure for providing the xDSL broadband transmission service, utilizing a non standard information field during the handshaking procedure to indicate a support of a non-standard mode between the central office and the customer premises equipment, and initiating the non-standard mode, in case no synchronization is established between the central office and the customer premises equipment after the handshaking procedure.

The method provides therefore a solution for special cases, when due to a difficult condition of the local loop, it is not possible to establish an xDSL broadband transmission service between the central office and the customer premises equipment. The method is in particular useful, when during a handshaking procedure between the central office and the customer premises equipment an xDSL transmission standard is selected with a defined profile, but the synchronization cannot be established after the handshaking procedure.

In a preferred embodiment, the method includes the step of reducing the transmission rate of the upstream and/or downstream link as defined in the profile of the selected xDSL transmission mode by a defined factor and trying again to establish a broadband transmission service with the reduced transmission rate. If still a stable synchronization cannot be established after the handshaking procedure, the transmission rate of the upstream and/or downstream link of the selected xDSL transmission mode is reduced a second time. The transmission rate is reduced consecutively according to the invention until a synchronized xDSL broadband transmission service is established.

Alternatively, in case a stable synchronization cannot be established after the handshaking procedure after the handshaking procedure, different values of impulse noise protection and/or delay are iteratively fed back to the central office until an xDSL broadband transmission service is established.

When finally an xDSL broadband transmission service is operating, the method can be used further to feedback diagnostic information about the local loop to the central office, to help the central office to understand why a synchronization could not be reached or maintained with the proposed profile.

The method can be implemented in the residential gateway by respective modifications of its middleware. The non-standard mode is implemented for example in a memory of the residential gateway and allows in particular to overrule the proposed profile of the central office. A residential gateway is also known as a DSL router, a DSL transceiver or an ADSL transceiver and is referred to in ITU recommendations as remote transceiver units xTU-R, e.g. HSTU-R.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
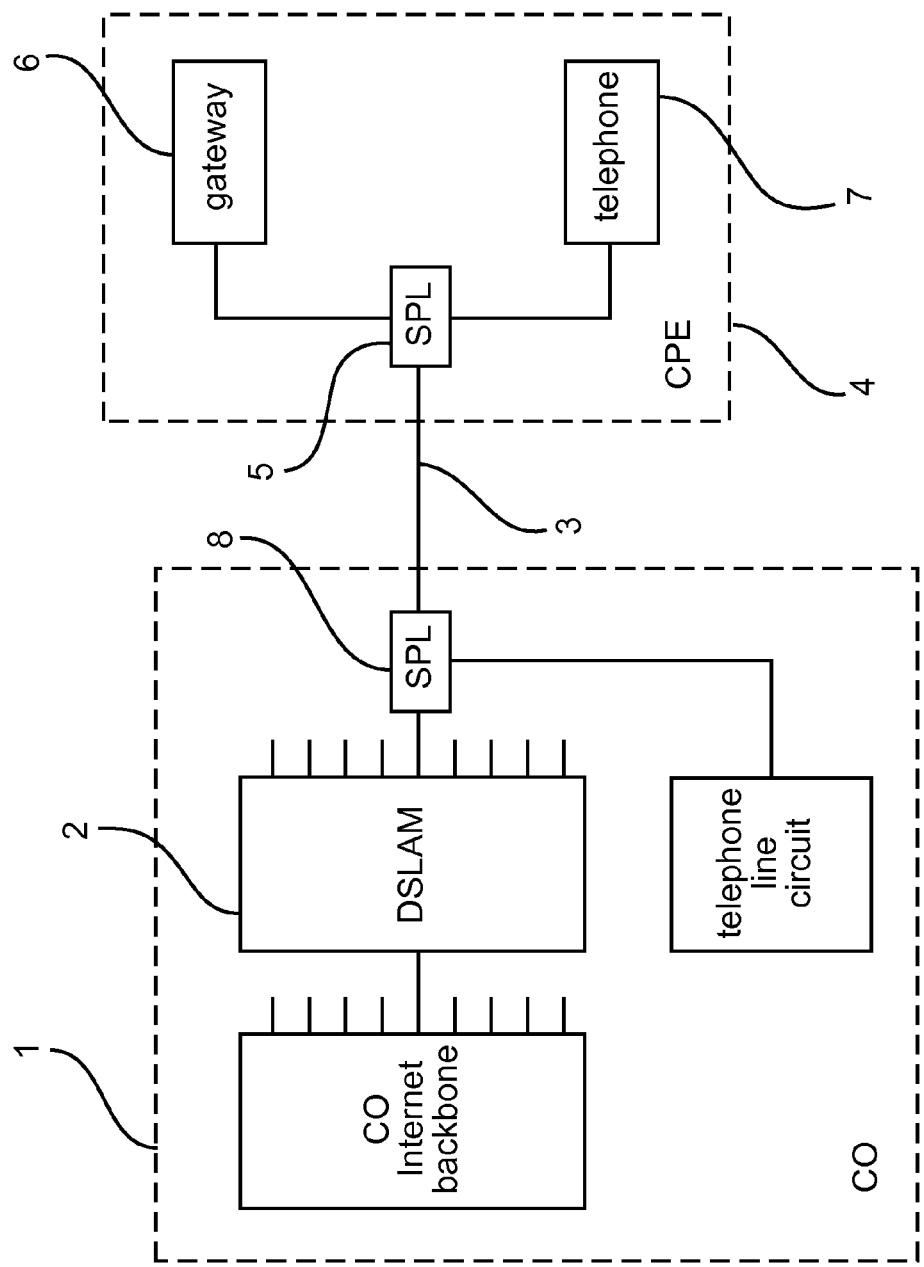
FIG. 1 a schematic diagram illustrating an xDSL transmission system for a local loop providing both broadband and narrowband telecommunication services, and FIG. 2 a method for initiating a non-standard mode for an xDSL transmission system as shown in FIG. 1.
Figure 2:
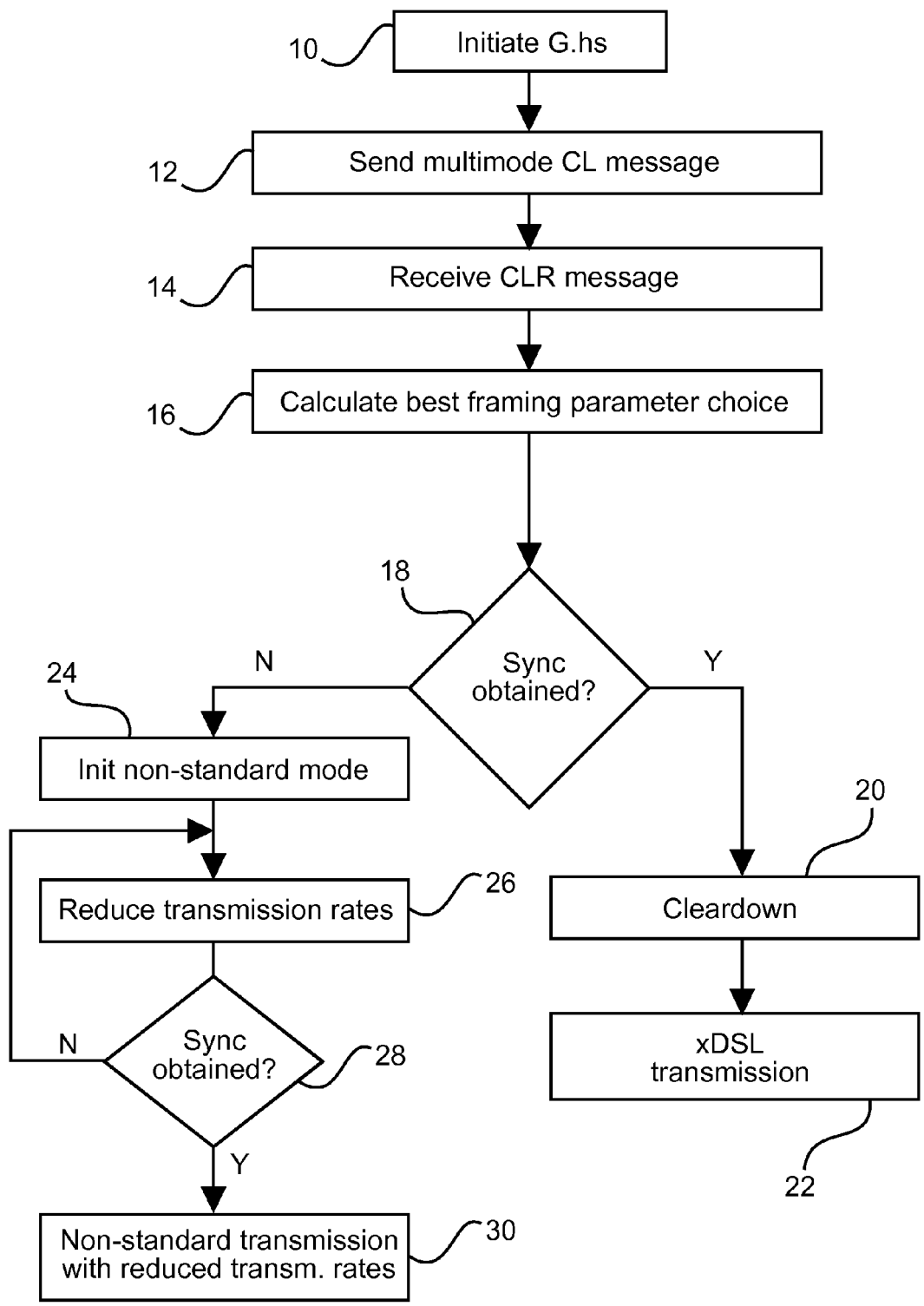

FIG. 2 describes an exemplary method for selecting a non-standard mode, in case an xDSL broadband transmission service between a residential gateway 6 of a user and a central office 1 cannot be established. The residential gateway 6 is coupled via a local loop 3 with the central office 1, as described with regard to FIG. 1.

When the residential gateway 6 is connected for a first time to the central office 1 via the local loop 3 and switched on, a handshaking procedure is started in a first step 10, for example similar to or as described by the ITU G.994.1 handshaking protocol. Possible messages are the messages CL, CLR, MR, MS, as described before, and other messages according to the G.994.1 handshaking procedure. These messages are used in transactions as defined for example by the G.994.1 handshaking procedure.

In a further step 12, the central office 1 recognizes that the residential gateway has been connected to the local loop 3 and sends a capabilities list message CL. In another step, the residential gateway sends to the central office a capabilities list message CLR including information about its xDSL transmission modes. The CLR message is received by the central office in a further step 14, and in a consecutive step, the central office analyzes the capabilities of the residential gateway 6. The ITU G.994.1 handshaking protocol is DSLAM oriented, meaning that the central office 1 is the master and the residential gateway 6 is treated as a slave device. During the handshaking procedure it is the central office 1 who is proposing a profile to the residential gateway 6 and the residential gateway 6 must follow. The profile consists in a set of parameters such as minimum bitrate, maximum bitrate, xDSL transmission modes that are supported, type of connection, impulse noise protection IMP, delay setting and so on. This information is mostly contained in the CL and CLR messages described before. After the exchange of these messages, an algorithm calculates in a step 16 what would be the best framing parameter choice in order to match the profile of the central office 1, and if a stable synchronization is reached in a step 18, the handshaking procedure is finished in a cleardown procedure, step 20, in which the modulation is terminated and after which the xDSL broadband transmission service starts up in step 22.

This described transaction is only one of several possible exemplary embodiments and also other basic transactions or extended transactions may be used in a similar way with regard to the G.994.1 handshaking procedure.

There can be cases in which, due to external factors, such as noise, bad wiring or long distances, the constraints of the profile provisioned by the central office 1 will conflict with the line condition of the local loop 3 and this can result in that the algorithm is not able to find a solution. In other words, the residential gateway 6 will not reach synchronization with the central office 1 after step 16. These are exceptional cases but in the unlike situation that these conditions occur there is no escape mechanism in the handshaking procedure as defined by the ITU standard G.994.1, to deal with the situation. The result is that the residential gateway 6 tries endlessly to achieve an xDSL broadband transmission service with the central office 1 without any success. There can be also other situations, in which the synchronization is periodically or occasionally lost during the start-up of the xDSL broadband transmission service due to spurious crosstalk from other xDSL broadband transmission services, e.g. during the training procedure of the xDSL transmission service.

For such situations, a non-standard mode is implemented in the central office 1 and in the customer premises equipment 4, e.g. the residential gateway 6, which non-standard mode is initialized for cases in which synchronization cannot be obtained, step 24. The non-standard mode is a modification of the handshaking protocol which allows the customer premises equipment 4 to overrule or to propose to the central office 1 a new set of profile constrained, in case no stable synchronization can be established.

The non-standard mode utilizes in particular a reduction of the transmission rates, e.g. the bit rates, of the upstream and/or downstream link of the selected xDSL transmission mode, step 26, and then it is tried again to establish the xDSL broadband transmission service by using the reduced transmission rate. The transmission rates of the upstream and/or downstream link can be reduced for example by a defined factor, e.g. by a factor of 2, to obtain a stable synchronization. If still no synchronization is obtained, step 28, step 26 is repeated and the transmission rates of the upstream and/or downstream link are further reduced, e.g. by a factor of 2. This loop including steps 26 and 28 is continued until synchronization is obtained and a stable broadband transmission service is established, step 30.

There is finally obtained a broadband transmission service, which may not be conform with any of the xDSL transmission standards, e.g. the ADSL or VDSL transmission standards, because the transmission rate as finally adjusted with the method may be well below any transmission rate as specified by one of the xDSL standards, but this non-standard transmission mode can be used advantageously to provide a feedback from the customer premises equipment 4 to the central office 1 in which all diagnostic information from the customer premises equipment 4 can be provided to the central office 1 to understand why the selected xDSL transmission mode could not be established with the initial settings. This information can be utilized possibly also in a further step to select an xDSL transmission mode with settings, which allows a stable xDSL broadband transmission service between the customer premises equipment 4 and the central office 1.

The following situation may occur: the central office 1 is provisioned in a fixed bitrate or in a variable bitrate with a defined minimum bitrate. The fixed rate may be called minimum bitrate X. During the handshaking procedure the residential gateway 6 will calculate in accordance with the signal-to-noise ratio (SNR) and all the noise measurements that occur during this phase, what is the maximum number of bits L that can be loaded given the configuration of the DSLAM 2. There can be cases, due to external noise conditions where the total number of bits L that can be loaded will result in a final bitrate Y which is lower than that required by the central office 1. If this happens, the handshaking procedure will terminate and restart with the hope that next initialization will produce a different outcome, but in reality, if the line condition of the local loop 3 does not change, this will just repeat over and over.

After initiating the non-standard mode, the residential gateway 6 will feedback to the central office 1 for example with a CLR message what is the total number of bits that can be achieved. With this information, the central office 1 can re-calculate the fixed rate or minimum bitrate X that is requested and then the next initialization will work.

In another example, the central office 1 is provisioned with a variable rate profile with a certain configuration of impulse noise protection Min_INP and delay Max_delay that impose constraints on the framing parameter choice on the residential gateway 6. Again in an extreme noisy condition of the local loop 3 it may happen that the residential gateway 6 cannot find a suitable bitrate to fulfill all the constraints coming from the profile of the central office 1. Again this will result in an endless loop, unless the line condition will approve. In the non-standard mode, the residential gateway 6 can iteratively feedback to the central office 1 different values of min_INP and max_delay that can result in a successful initialization.

The invention defines therefore a method that allows a customer premises equipment 4 to bypass or to overrule the constraints imposed by the profile of the central office 1, in particular as included in the handshaking protocol defined by the ITU standard G.994.1, in order to give the customer premises equipment 4 the full freedom to obtain a data transfer mode with a limited bitrate that just allows to transfer some diagnostic data over a local loop between the customer premises equipment 4 and the central office 1. This allows the central office 1 to gather all the necessary information to identify the problem why the connection in its default configuration was not working, and to correct it. The handshaking protocol may not lead to a stable synchronization due to a long distance between the customer premises equipment 4 and the central office 1, bad house wiring, high external noise, or other interferences. Upon receiving the diagnostic data, the link over the local loop can be dropped and a handshaking protocol may be started again leading to a stable xDSL broadband transmission service.

The method allows therefore an operator of an Internet Service Provider to inspect a local loop that normally cannot achieve a data transfer mode, by running the local loop with the non-standard mode for a minimum time necessary to gather diagnostic information that can help the operator to find out why a certain customer premises equipment cannot achieve an xDSL broadband service.

The method as described with regard to steps 10-30 initiates therefore a non-standard mode, in case no synchronization can be established between the customer premises equipment and the central office after the handshaking procedure. The non-standard mode allows therefore to establish a restricted transmission service in cases of difficult conditions of the local loop 3.

The non-standard transmission mode can be established in a preferred embodiment by reducing the upstream and/or downstream link transmission rates of a selected xDSL transmission standard one or several times, until a stable broadband transmission service is established. In particular, only the downstream link transmission rates of a selected xDSL transmission standard may be reduced one or several times, until a stable broadband transmission service is established. But also other embodiments of the invention may be utilized by one skilled in the art without departing from the scope of the present invention. The invention resides therefore in the claims herein after appended.

The invention claimed is:

1. Method for providing an xDSL broadband transmission service between a central office and a customer premises equipment via a local loop, the method comprising:
    initiating a handshaking procedure between the central office and the customer premises equipment,
    determining an xDSL transmission standard with a specified transmission rate during the handshaking procedure for providing the xDSL broadband transmission service,
    utilizing a non-standard information field during the handshaking procedure to indicate a support of a non-standard mode between the central office and the customer premises equipment,
    initiating the non-standard mode, in case no synchronization is established between the central office and the customer premises equipment after the handshaking procedure, and reducing the transmission rate below a lowest transmission rate as defined in said xDSL standard and trying again to establish synchronization for said broadband transmission service, and
    in case synchronization is subsequently established, providing a non-standard transmission with reduced transmission rate for feeding diagnostic information about the local loop back to the central office.

2. The method of claim 1, comprising: reducing the transmission rate of the upstream and/or downstream link of the selected xDSL transmission mode by a defined factor and trying again to establish synchronization for said broadband transmission service.

3. The method of claim 2, comprising: reducing the transmission rates of the upstream and/or downstream link of the selected xDSL transmission standard in consecutive steps until synchronization is established.

4. The method of claim 1, comprising: reducing the transmission rate below the transmission rate as defined in a profile provisioned by the central office.

5. The method of claim 1, comprising: iteratively feeding back to the central office different values of impulse noise protection and/or delay until synchronization for said xDSL broadband transmission service is established.

6. The method according to claim 1, wherein the xDSL transmission standard is an ADSL, ADSL2, ADSL2+ or VDSL transmission standard.

7. Method for providing an xDSL broadband transmission service between a central office and a customer remises equipment via a local loop, the method comprising:
    initiating a handshaking procedure between the central office and the customer premises equipment,
    determining an xDSL transmission standard with a defined transmission rate during the handshaking procedure for providing the xDSL broadband transmission service,
    utilizing a non-standard information field during the handshaking procedure to indicate a support of a non-standard mode between the central office and the customer premises equipment,
    initiating the non-standard mode, in case no synchronization is established between the central office and the customer premises equipment after the handshaking procedure,
    reducing said transmission rate and checking again whether synchronization is established, and
    in case no synchronization is obtained, reducing said transmission rate consecutively in further steps, until a synchronization is established for said broadband transmission service.

8. The method of claim 7, further comprising: reducing the transmission rate below the lowest transmission rate as defined in said xDSL standard.

9. The method of claim 7, further comprising: reducing the transmission rate below the transmission rate as defined in a profile provisioned by the central office.

10. A residential gateway being configured to provide an xDSL broadband transmission service between a central office and the residential gateway via a local loop, and being configured to:
    initiate a handshaking procedure between the central office and the customer premises equipment,
    determine an xDSL transmission standard with a specified transmission rate during the handshaking procedure for providing the xDSL broadband transmission service,
    utilize a non-standard information field during the handshaking procedure to indicate a support of a non-standard mode between the central office and the customer premises equipment,
    initiate the non-standard mode, in case no synchronization is established between the central office and the customer premises equipment after the handshaking procedure,
    reduce said transmission rate and check again whether synchronization is established, and
    feed diagnostic information about the local loop back to the central office.

11. The residential gateway of claim 10, wherein the non-standard mode is implemented in a memory of the residential gateway to overrule a proposed profile of the central office.

12. The residential gateway of claim 10, wherein the gateway is further configured to reduce said transmission rate consecutively, in case no synchronization is obtained, until a synchronization is established for said broadband transmission service.

13. The residential gateway of claim 10, wherein the gateway is further configured to reduce the transmission rate below the transmission rate as defined in a profile provisioned by the central office.

14. The residential gateway of claim 10, wherein the gateway is further configured to iteratively feed back to the central office different values of impulse noise protection and/or delay until synchronization for said xDSL broadband transmission service is established.

15. The residential gateway of claim 10, wherein the xDSL transmission standard is an ADSL, ADSL2, ADSL2+ or VDSL transmission standard.

* * * * *